United States Patent

| [72] | Inventor | Raymond C. Fisher<br>Hinsdale, Ill. |
|---|---|---|
| [21] | Appl. No. | 764,131 |
| [22] | Filed | Oct. 1, 1968 |
| [45] | Patented | Aug. 3, 1971 |
| [73] | Assignee | International Harvester Company<br>Chicago, Ill. |

[54] SEED METERING DEVICE
6 Claims, 8 Drawing Figs.

[52] U.S. Cl. ............................................... 111/76
[51] Int. Cl. .................................................. A01c 7/18
[50] Field of Search .......................................... 111/76, 77, 78, 51; 221/298, 299, 301; 222/371

[56] References Cited
UNITED STATES PATENTS

| 1,008,429 | 11/1911 | Osmer | 221/301 |
|---|---|---|---|
| 2,053,390 | 9/1936 | Bateman et al. | 111/77 UX |
| 2,758,756 | 8/1956 | Tea, Jr. | 222/371 X |
| 3,155,058 | 11/1964 | Valdi | 111/76 X |
| 3,133,515 | 5/1964 | Beebe | 111/51 UX |
| 3,185,118 | 5/1965 | Greene | 111/51 |
| 1,306,153 | 6/1919 | Krotz | 111/51 |
| 1,076,145 | 10/1913 | Murphey | 111/51 |

FOREIGN PATENTS

| 989,995 | 4/1965 | Great Britain | 111/76 |
|---|---|---|---|

Primary Examiner—Robert E. Pulfrey
Assistant Examiner—Stephen C. Pellegrino
Attorney—Floyd B. Harmon ABSTRACT: A high capacity seed metering device is provided which also has high tolerance to seed size and shape, wherein the seed is fed to a relatively stationary plate separate from the hopper and having openings communicating with a plurality of inclined chutes through which the seed passes on the way to the furrow. Bridging of the seed at the openings is prevented and advance thereof through the chutes or passage is accomplished by vibrating the plate and the chutes.

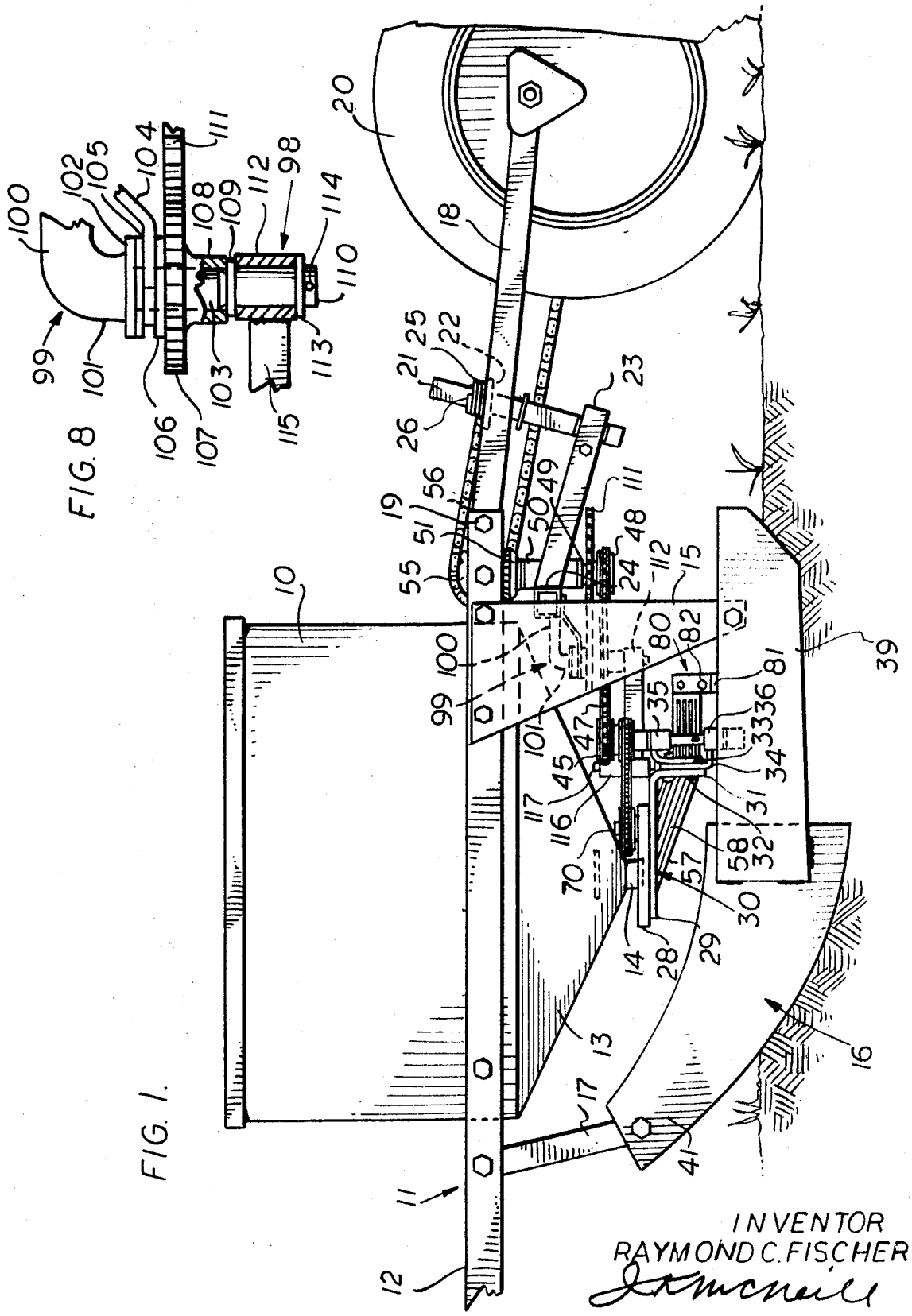

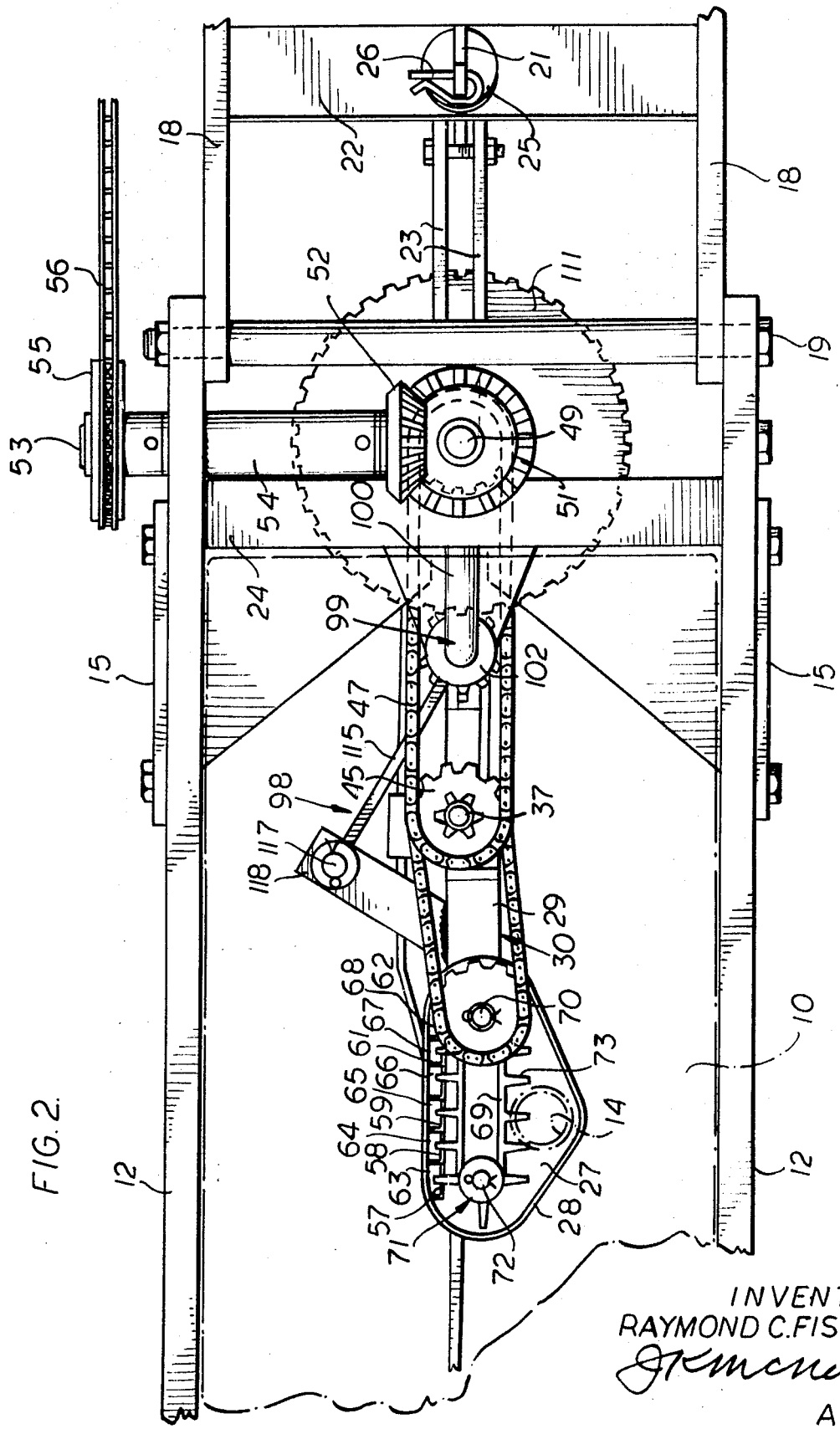

PATENTED AUG 3 1971
3,596,615
SHEET 3 OF 3
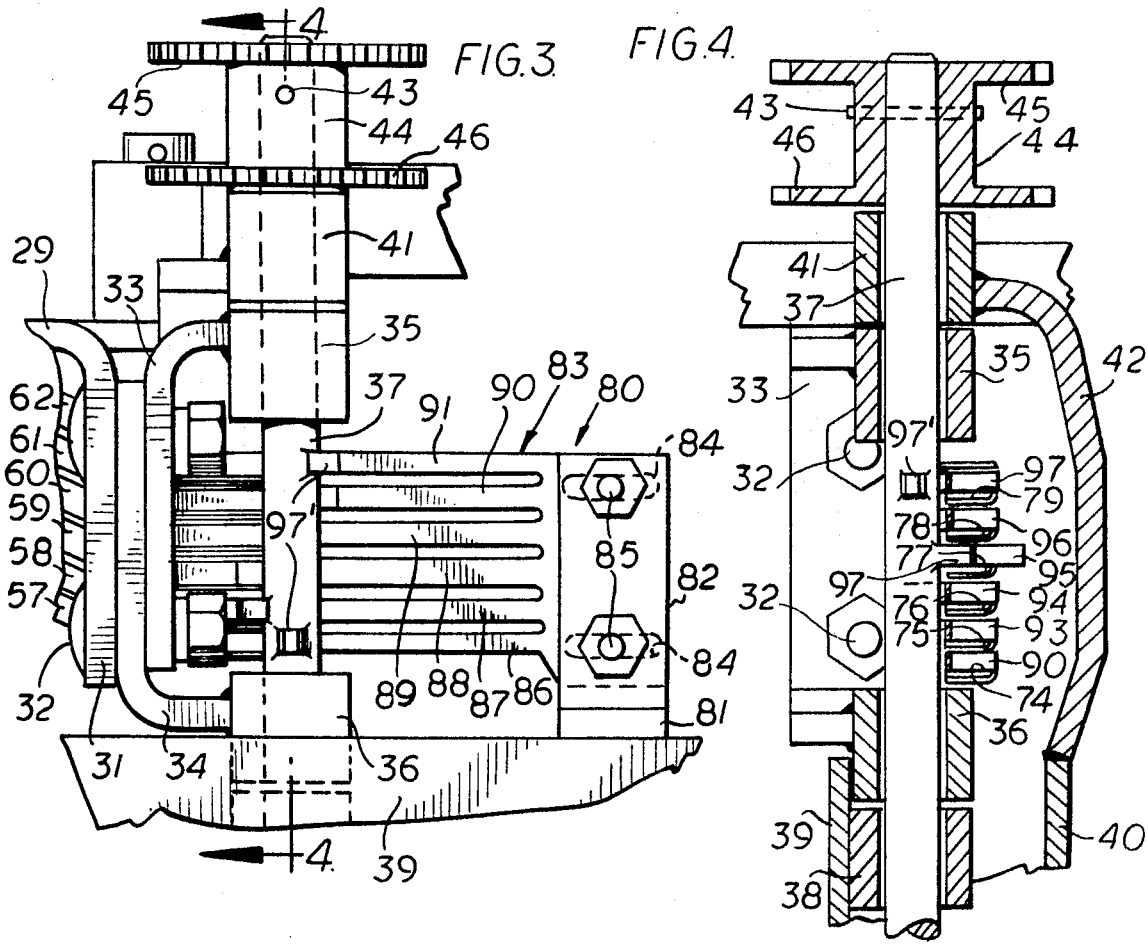
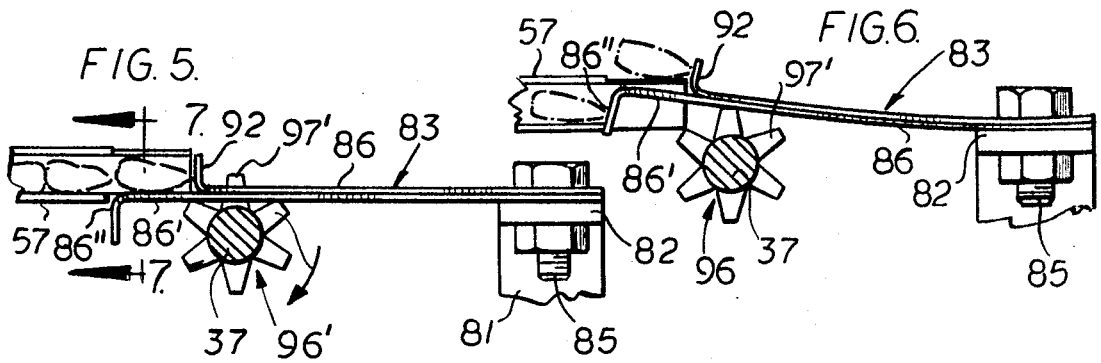
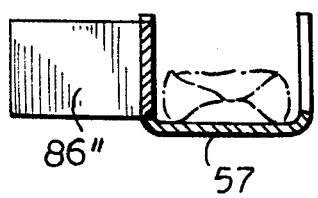
INVENTOR
RAYMOND C. FISCHER
ATT'Y

SEED METERING DEVICE

BACKGROUND OF THE INVENTION

This invention relates to agricultural implements and particularly to planters. More specifically, the invention concerns a high capacity planter having high tolerance to seed size and shape.

Modern high speed planting operations have been limited in effectiveness by the nature of the equipment in common use and conventional seed plate planters have required the maintenance of large stocks of plates having cells of different size to fit seed of a certain size. The present invention has for its object the provision of novel planting apparatus of high capacity adaptable to high speed operations and capable of simultaneously planting seed, for example, corn, of varying size and shape.

To accomplish this purpose the seed plate to which seed from the hopper is fed is mounted separately from and independently of the hopper and constitutes a platform upon which the seed is deposited in a layer. Unlike the conventional rotatable seed plate the seed platform of this invention is relatively stationary and the seed is moved over its surface by a driven endless belt having fingers engageable with the seed. Integral with the platform is a series of inclined chutes the upper end openings of which communicate with the surface of the plate or platform to receive the seed moved by the rotating fingers. The seed is agitated and prevented from bridging at the openings and assisted in advancing through the chutes to their outlets by vibrating the plate and chute unit.

DESCRIPTION OF THE DRAWINGS

FIG. 1 is a view is side elevation of a portion of a planter unit having incorporated therein seed metering apparatus according to this invention;

FIG. 2 is a plan view on a larger scale of a portion of the structure shown in FIG. 1;

FIG. 3 is an enlarged detail in side elevation of a portion of the seed metering device of this invention.

FIG. 4 is a section taken on the line 4–4 of FIG. 3;

FIG. 5 is a diagrammatic detail showing the means by which seed is ejected to the furrow;

FIG. 6 is a view similar to FIG. 5 showing a seed being ejected;

FIG. 7 is a section taken on the line 7–7 of FIG. 5; and

FIG. 8 is a sectional detail of a portion of the vibrating mechanism.

DESCRIPTION OF THE PREFERRED EMBODIMENT

As shown in FIG. 1, a seed hopper 10 is mounted on a supporting framework 11 including side rails 12 between which the hopper is bolted, the hopper having a slanting bottom 13 terminating in a downwardly projecting tubular outlet 14. A pair of sideplates 15 depending from rails 12 support the rear end of a furrow opener 16 the forward end of which is connected by a strap 17 to one of the rails 12.

The forward end of frame 11 is mounted upon a tool bar or other supporting structure, not shown, and the rear end of the frame includes a pair of laterally spaced bars 18 pivotally mounted upon a bolt 19 and carrying between their rear ends a ground engaging wheel 20. Wheel 20 is restrained from swinging upwardly by the provision of a bar 21 slidable in a slot formed in a brace 22 extending between bars 18, the lower end of bar 21 being anchored to the rear end of a bracket 23 affixed to a transverse bar 24 extending between and secured to plates 15. A spring 25 extends between brace 22 and a pin 26 inserted in an opening in bar 21.

Seed discharged through tubular outlet 14 at the bottom of hopper 10 is deposited on a seed plate or platform 27 having a rim 28 affixed to the horizontal portion 29 of an angle bracket 30 having a vertical side 31. Side 31 of ant 30 is secured by bolts 32 to a pair angle bars 33 and 34 to which are secured vertically spaced aligned bearings 35 and 36. Bearings 35 and 36 rotatably receive an actuator member in the form of a shaft 37, the function of which will be hereinafter more fully described. The lower end of shaft 37 is received in another bearing 38 affixed to a plate 39 shown in FIG. 4, forming with another plate 40 a pair of laterally spaced runner extensions secured at their forward ends to the forward earth penetrating portion 41 of furrow opener 16. The upper portion of shaft 37 is rotatable in another bearing 41 carried at the upper end of a bracket 42, shown in FIG. 4, affixed at its lower end, as by welding, to runner extension 40.

The upper end of shaft 37 has secured thereto by pin 43 a drive member 44 having formed integrally therewith a pair of sprocket wheels 45 and 46, wheel 45 having driving connection by a chain 47 with another sprocket wheel 48 mounted at the lower end of a shaft 49 rotatable in a bearing 50 affixed to transverse frame member 24 and having secured to its upper end a bevel gear 51. Bevel gear 51 is engaged by another bevel gear 52 mounted at one end of a shaft 53 rotatable in a bearing 54 affixed to frame bar 12. A sprocket wheel 55 is mounted on the other end of the shaft 53 and is drivingly connected by a chain 56 with suitable gearing, not shown, driven by ground wheel 20.

As pointed out before, seed in hopper 10 is discharged through outlet 14 and deposited on the surface of plate or platform 27 in a single layer. A plurality of contiguous inclined chutes or passages 57, 58, 59, 60, 61 and 62 are affixed at their upper ends to platform 27 with the openings 63, 64, 65, 66, 67, and 68, respectively, at their upper ends communicating with the surface of platform 27. These openings are in the path of seed moved across the surface of plate or platform 27 by means comprising an endless belt 69 trained at one end around a suitable pulley, now shown, carried by a shaft 70 mounted at its lower end on and projecting upwardly from platform 27, and at its other end around a pulley 71 carried by a stub shaft 72 mounted on platform 70.

A plurality of spaced fingers 73 projecting laterally from belt 69 adjacent the surface of platform 27 engage the seed and sweep the latter over the openings 63 to 68. Chutes 57 to 62 are disposed at an angle with respect to platform 27 and their other ends are vertically stacked to provide vertically aligned outlets 74, 75, 76, 77, 78, and 79, as indicated in FIG. 4. The seed discharged from these outlets falls downwardly between the sideplates 39 and 40 into the furrow formed by the furrow opener 16. Seed is prevented from prematurely discharging from outlets 74 to 79 by the provision of a spring steel combination closure and ejector assembly indicated at 80 in FIGS. 1 and 3. This assembly includes an L-shaped bracket having a horizontal portion 81 affixed to runner extension 39 and an upright portion 82. A double sheet spring steel member 83 is provided with slots 84 and is adjustably secured at one end to upright 82 by bolts 85.

Member 83 is slotted as shown clearly in FIG. 3 to provide individually flexible spring fingers 86, 87, 88, 89, 90, and 91, one for each of the outlets 74 to 79, respectively. The sidewalls of chute 57, for example, have been cut away near the end of the chute and one wall is replaced by an extension 86' of finger 86 the end of which is turned laterally to form a flange 86''. An oppositely directed flange 92 forms a closure for the end of the chute in FIG. 5. In FIG. 5 it will be noted that a seed has arrived at the end of chute 57 and is retained by extension 86' and flange 92. Closure flanges 93, 94, 95, 96, and 97 are provided for each of the outlets at the ends of chutes 58, 59, 60, 61, and 62, respectively.

Each of the spring fingers 86 to 91, inclusive, provides stop means and knockout means for seed as it reaches the ends of the respective chutes 57 to 62, the spring fingers being successively deflected by actuator means indicated at 96' of which shaft 37 forms a part. A plurality of axially spaced circumferentially displaced cam lobes 97', one for each of the spring fingers 86 to 91, inclusive, are integrally formed with shaft 37 and project radially therefrom. Each of the cam lobes is successively engageable, during rotation of shaft 37, with one of the knockout members or spring fingers to eject the seed at the end of the chute as indicated in FIGS. 5 and 6, flange 92 functioning in each case to engage a succeeding seed and prevent its further advance until the terminal seed has been ejected. The deflected knockout member than returns to the position indicated for member 86 in FIG. 5.

The seed on platform 27 is prevented from bridging about the openings 63 to 68 and the frictional resistance of the chutes 57 to 62 to the movement of the seed therethrough to the outlets are overcome by means tending to agitate the seed. Mechanism for performing this function may take other forms, but for the purposes of this invention a specific form of device is provided, and hereinafter described, designed to vibrate the plate for platform and the seed chutes. This vibratory mechanism is generally designated by the numeral 98 and includes a bracket 99 having a horizontal portion 100 affixed to transverse frame bar 24, and a vertical portion 101 having an increased diameter shoulder 102 and a reduced diameter shaft portion 103, best shown in FIG. 8. The forked end of member 104 fits into a groove between portions 105 and 106 of gear 107, to locate it axially. Washer 105 separates the shoulder on 101 from the gear hub. The depending hub portion 108 of the gear has affixed to it, as by welding, a closure 109 including a depending stub shaft 110.

As will be observed in FIG. 8, stub shaft 110 is an eccentric, the axis of which is offset relative to the axis of shaft section 103 and is driven by the meshing of gear 107 with a drive gear 111 mounted on shaft 49.

A sleeve 112 in which shaft 110 is rotatable, is retained by a washer 113 and a cotter pin 114, and has secured to it one end of a bar 115, the other end of which is affixed to a sleeve member 116 mounted on a pin 117 carried in one end of a lug 118 secured, as by welding, to seed plate supporting member 29. Thus, rotation of eccentric 110 reciprocates bar 115 and transmits vibration to platform 27 and seed chutes 57 and 62 to agitate the seed to prevent its bridging at openings 63 to 68, and to overcome the inertia of the seed and the frictional resistance of the chutes to passage of the seed therethrough.

It is believed that the construction and operation of the novel seed metering apparatus of this invention will be clearly understood from the foregoing description. It should likewise be understood that the invention has been described in its preferred embodiment and that modifications may be made therein without departing from the spirit of the invention or the scope of the appended claims.

What I claim is:

1. A planter having a frame, a furrow opener, a seed hopper having an outlet defined by a rim in the bottom thereof, said hopper being mounted on the frame for discharging seed to the furrow formed by said furrow opener and seed metering means between the hopper and the furrow opener comprising: a platform disposed between said seed hopper on which seed discharged from the hopper is deposited, said platform disposed below said seed hopper such that the spacing between the surface of the platform and the rim of said outlet is slightly greater than the thickness of a seed so that seeds are deposited on the platform in a single layer, driven seed engaging means mounted adjacent the platform for moving the seeds over the platform, a plurality of inclined elongated passages having openings in their upper ends communicating with the surface of said platform in the path of the moving seed to receive the latter therein and having outlets at their other end for discharging seed to said furrow, and vibratory means carried by the frame and operatively engageable with said platform and said passage for vibrating the latter sufficiently to overcome the frictional resistance of the passage to the movement of seed therethrough.

2. The invention set forth in claim 1, wherein said passages are integral with said platform and said vibratory means is operatively connected to said platform and said passages to agitate the seed and assure its feeding from the platform to said opening and the advance of seed through said passages.

3. A planter having a frame, a furrow opener, a seed hopper mounted on the frame for discharging seed to the furrow formed by said furrow opener and seed metering means between the hopper and the furrow opener comprising, a platform on which seed discharged from the hopper is deposited, driven seed engaging means mounted adjacent the platform for moving the seed over the platform, a plurality of inclined elongated passages having openings in their upper end communicating with the surface of said platform and the path of the moving seed to receive the latter therein and having outlets at their other end for discharging seed to said furrow, said passages being vertically stacked inclined tubular chutes having their seed receiving openings in a horizontal plane and their discharge outlets in a vertical plane, vibratory means carried by the frame and operatively engageable with said platform and said passages for vibrating the latter sufficiently to overcome the frictional resistance of the passage to the movement of seed therethrough, stop means supported by said frame adjacent each of said discharge outlets to prevent premature seed discharge, knockout means, and means for periodically actuating said knockout means to displace said stop means and eject seed from said outlets.

4. The invention set forth in claim 3, wherein said stop means is unitary with said knockout means and of said knockout means.

5. The invention set forth in claim 1, wherein said knockout means includes a leaf spring, one being provided for each of said outlets, and an actuator member rotatably mounted on the frame is provided with cam lobes engageable with said leaf springs during rotation of said actuator member to displace said springs and eject the seed.

6. The invention set forth in claim 5, wherein said actuator member includes a driven vertical shaft parallel to and adjacent said vertically stacked outlets and said cam lobes are relatively circumferentially displaced about the axis of the actuator member and are successively engageable with the respective of said leaf springs during rotation of the actuator member.